(12) United States Patent
Brand et al.

(10) Patent No.: US 11,898,640 B2
(45) Date of Patent: Feb. 13, 2024

(54) RING SEAL

(71) Applicant: BRUSS SEALING SYSTEMS GMBH, Hoisdorf (DE)

(72) Inventors: Manfred Brand, Tremsbüttel (DE); Henning Schmidt, Ahrensburg (DE); Sebastian Teuscher, Hamburg (DE)

(73) Assignee: BRUSS SEALING SYSTEMS GMBH, Hoisdorf (DE)

(*) Notice: Subject to any disclaimer, the term of this patent is extended or adjusted under 35 U.S.C. 154(b) by 0 days.

(21) Appl. No.: 17/893,298

(22) Filed: Aug. 23, 2022

(65) Prior Publication Data

US 2023/0054248 A1 Feb. 23, 2023

(30) Foreign Application Priority Data

Aug. 23, 2021 (DE) .................. 10 2021 209 233.0

(51) Int. Cl.
*F16J 15/3284* (2016.01)

(52) U.S. Cl.
CPC .................. *F16J 15/3284* (2013.01)

(58) Field of Classification Search
CPC ...... F16J 15/3284; F16J 15/32; F16J 15/3204; F16J 15/3232; F16J 15/3236; F16J 15/56
See application file for complete search history.

(56) References Cited

U.S. PATENT DOCUMENTS 5,261,677 A  11/1993 Gotoh et al.

FOREIGN PATENT DOCUMENTS

| DE | 195 45 172 A1 | 6/1997 | |
|---|---|---|---|
| DE | 103 60 601 A1 | 7/2005 | |
| DE | 102014014033 A1 * | 3/2016 | ............ F16J 15/024 |
| DE | 10 2020 113 065 A1 | 11/2021 | |
| EP | 1 988 312 A1 | 11/2008 | |
| JP | S 62 171506 | 7/1987 | |

OTHER PUBLICATIONS

Search Report issued by the German Patent and Trademark Office with respect to the German priority application No. 10 2021 209 233.0.

* cited by examiner

*Primary Examiner* — Gilbert Y Lee
(74) *Attorney, Agent, or Firm* — Saliwanchik, Lloyd & Eisenschenk

(57) ABSTRACT

The invention relates to a ring seal for sealing a gap between two parts that can be moved axially to one another, with a cross-sectional profile, which is constant in the circumferential direction and has a symmetrical design with respect to a radially oriented axis of symmetry (S), and with a dynamic sealing surface arranged radially outside or radially inside on the cross-sectional profile, and a groove base area arranged radially opposite the sealing surface, wherein that the sealing surface has a first central section (I) which, in the cross-sectional profile, has a radius R of R<B/2 with respect to an axial width B of the ring seal, and the sealing surface further has a second and third section (II, III) which enclose the first central section between them, and that the sealing surface in the region of the second and third sections (II, III) is in each case embodied as a planar annular surface which is oriented at an angle (α) of 60 to 85 degrees with respect to the axis of symmetry of the cross-sectional profile.

5 Claims, 4 Drawing Sheets

RING SEAL

CROSS-REFERENCE TO RELATED APPLICATIONS

This application claims priority to German Patent Application No. 10 2021 209 233.0, filed on Aug. 23, 2021; which is incorporated in its entirety herein.

FIELD OF THE INVENTION

The present invention relates to a ring seal having the features of claim 1.

BACKGROUND OF THE INVENTION

Ring seals are used, for example, where gaps have to be sealed between two parts that perform a lifting or axial movement with respect to one another in the direction of their longitudinal axes, wherein the gap width remains substantially constant. For this purpose, the ring seals have a D- or O-shaped cross-sectional profile that is constant in the circumferential direction. The ring seals are fixed in an annular groove on one of the parts and are dimensioned such that they abut, with a sealing surface, sealingly against a wall of the opposite part and thus seal the gap.

For example, automatic transmissions of motor vehicles are one possible application in which, for example, a pressure chamber, under a pressure of 12 bar, of an actuator piston, which is filled with a transmission oil in a temperature range between 110 and 160° C., has to be sealed. Because of the very limited installation space available in modern automatic transmissions having a very high number of transmission stages, all parts of the automatic transmission must thus also be designed to save as much space, i.e., to be as compact, as possible.

Such a ring seal is known, for example, from DE 195 45 172 C2.

Furthermore, the frictional forces occurring between the ring seal and the part to be sealed are to be as small as possible when performing displacement movements, with a simultaneously high service life of the ring seal.

For this purpose, EP 1 988 312 B1 proposes a ring seal in the form of a D-ring which, on its sealing surface, is to have a specific radius R with respect to the width A of the D-ring in the axial direction according to the equation $A/2 < R < 13A^2$.

BRIEF SUMMARY

Against this background, the object of the invention is to provide a ring seal which makes it possible to seal a gap between two parts, moved axially to one another, with further reduced frictional forces, with, at the same time, effective sealing and a long service life.

To achieve the object, a ring seal having the features of claim 1 is proposed. Further preferred developments can be found in the dependent claims, the figures, and the associated description.

DETAILED DESCRIPTION

According to the basic idea of the invention, it is proposed that the ring seal, in the region of the sealing surface, have a first central section, which, in the cross-sectional profile, has a radius R of $R < B/2$ with respect to an axial width B of the ring seal, and the sealing surface further have a second and third section which enclose the first central section between them, and that the sealing surface in the region of the second and third sections be in each case embodied as a planar annular surface which is oriented at an angle of 85 degrees to 60 degrees with respect to the axis of symmetry of the cross-sectional profile.

The advantage of the proposed ring seal can be seen in the fact that, by means of the first section formed in the proposed radius, very low frictional forces can be realized during a translatory displacement of the two parts relative to one another, without the sealing effect being lost. It has been found that the frictional forces can be reduced again by reducing the radius. Due to the annular surfaces, oriented as planar at the proposed angle, of the sealing surface in the second and third sections, the ring seal can thus perform transverse movements during the translatory movement of the parts, without the frictional forces thereby increasing. The ring seal is deliberately shaped by the proposed design in the second and third sections in such a way that it abuts sealingly only with its first section so as to contact the opposite wall, even during the pivoting movements. The ring seal is therefore deliberately designed in such a way that it seals only with the first section at lower pressures to be sealed and with the smaller forces resulting therefrom, and, with the second or third section, sealingly forms a contact with the wall only at higher pressures or higher forces.

It is further proposed that the sealing surface, starting from the first section, merge tangentially into the second and third sections. With the proposed solution, the transition from the first section to the second and third sections is continuously realized, so that the tilting movements of the ring seal during the translatory displacement movement are not impaired by the overcoming of an edge.

It is further proposed that the sealing surface, starting from the second and third sections, merge into a respective side face, and the side faces be oriented at an angle of 5 to 30 degrees to the axis of symmetry. In principle, the side faces arranged at an angle to the axis of symmetry enable a tilting movement of the ring seal in a groove having side walls that are oriented in parallel to one another and opposite the side faces. At the same time, the side faces oriented at said angle, owing to their angular orientation at a certain angular position of the ring seal, also limit the tilting movement by forming a planar contact with the side faces on the side walls of the groove. The side faces thus virtually form a stop that delimits the tilting movement of the ring seal.

It is further proposed that the ring seal be tapered in a region between the side faces and the groove base area. With the proposed development, the ring seal, in the region of its tapering, is deliberately provided with a weak spot, which facilitates the tilting movement or defines a pivot center. Therefore, the ring seal is not pivoted during a displacement movement of the parts to be sealed in the region of the groove base area up to the tapering, and only the part of the ring seal from the tapering to the sealing surface is pivoted, i.e., practically speaking, the part of the ring seal which is delimited laterally by the inclined side faces.

It is further proposed that the ring seal have a greater maximum width in the region of the side faces than in the region of the groove base area. As a result of the proposed development, it is ensured that, in an arrangement in a groove having side walls aligned parallel to one another, the ring seal always abuts with the side faces sealingly against the side walls, whereas, in the region of the groove base area, they are supported only on the base area of the groove. The ring seal is thereby, practically speaking, divided into two functional sections, viz., a section for implementing the sealing function in the region of the side faces and the sealing surface, and a section for supporting the ring seal in the groove in the region between the side faces and the groove base area.

It is further proposed that a depression extending in the circumferential direction of the ring seal be provided in the groove base area. As a result of the depression, a free space extending over the circumference is formed in the groove base area, said space being delimited by two ring sections of the ring seal that are spaced apart and supported by the base area of the groove. As a result of the free space, a compression movement of the ring seal in the direction of the groove base area is, in addition, facilitated or encouraged, and the ring seal can thus yield with respect to acting radial forces by a movement in the direction of the groove base area. As a result, the frictional forces in the sealing surface can be further reduced without the sealing effect being lost.

BRIEF DESCRIPTION OF THE FIGURES

The invention is explained below on the basis of a preferred embodiment with reference to the accompanying drawings. Shown are:

FIGS. 1 and 2 show a ring seal 1 according to the invention in cross-sectional profile. The ring seal 1 is designed as a closed ring and has, over the entire circumference, the compact cross-sectional profile shown in FIG. 1. The cross-sectional profile of the ring seal 1 is symmetrical with respect to a radially directed axis of symmetry S.

The ring seal 1 can be subdivided into two functional sections, viz., the sealing body 8 and the support body 9, which are separated from one another by a tapered section. The tapered section is formed by two, opposing, concave recesses 6 and 7 and thereby has a reduced width B2 at the narrowest point. The support body 9 forms the radially inner side of the ring seal 1, and the sealing body 8 forms the radially outer side of the ring seal 1. However, it is equally conceivable that the support body 9 form the radially outer side of the ring seal 1 and the sealing body 8 form the radially inner side.

Figure 3:
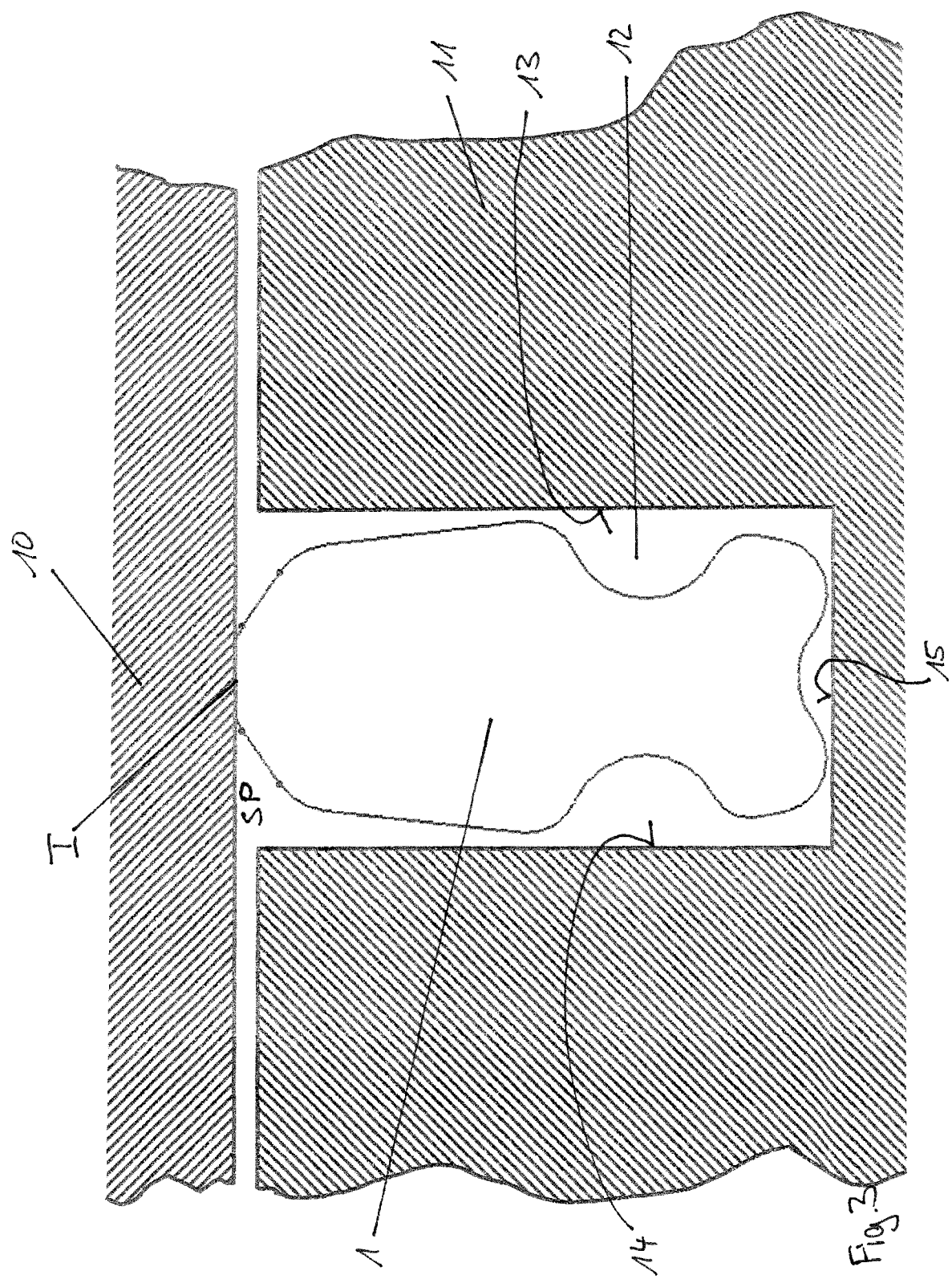
FIG. 3 a ring seal according to the invention in the installed state between two stationary parts.
Figure 4:
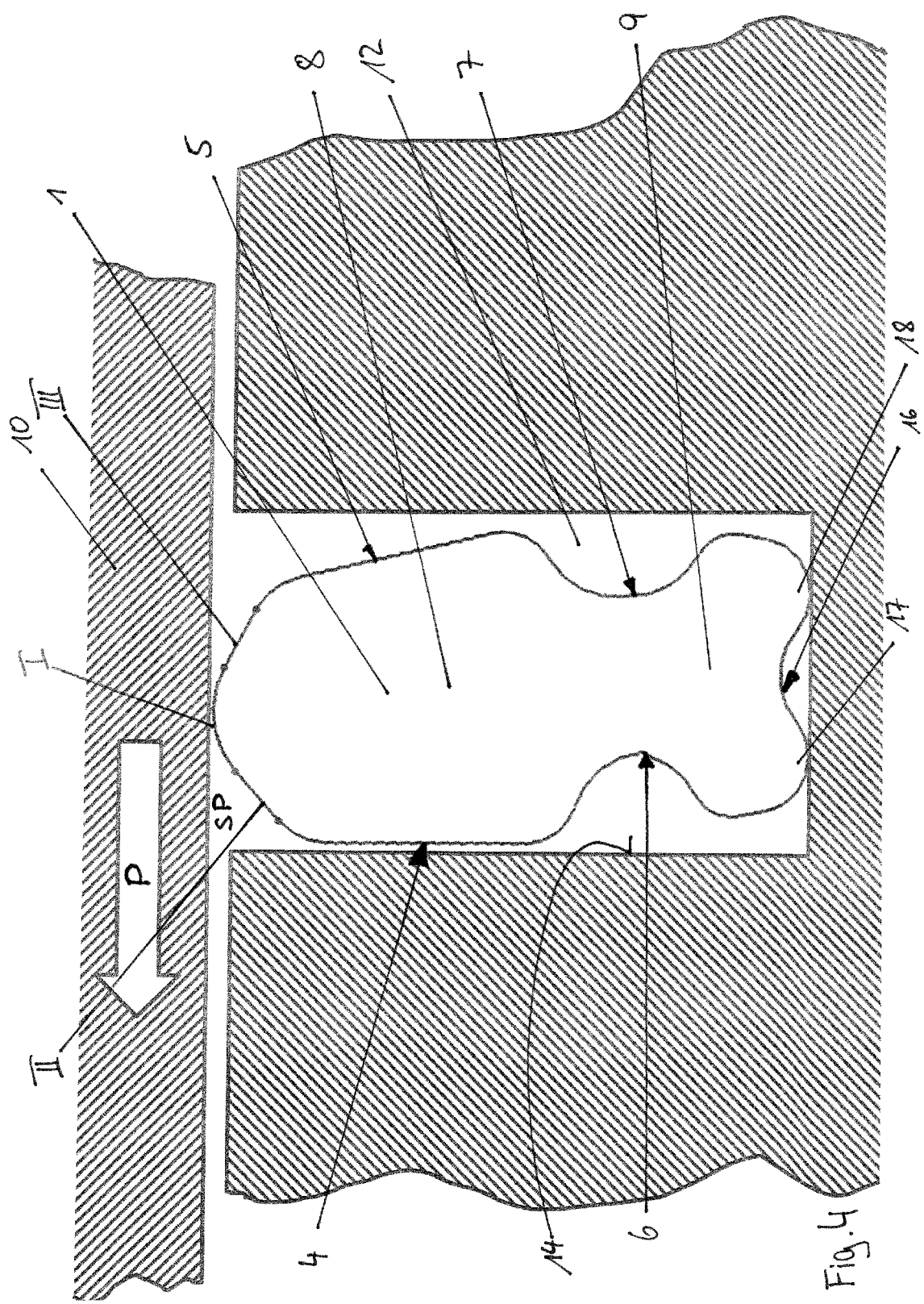
FIG. 4 a ring seal according to the invention in the installed state during a translatory displacement movement of one part with respect to the other part.

In the installation position of the annular seal 1, which can be seen in FIGS. 3 and 4, the support body 9 abuts against a base area 15 of a groove 12 and has a groove base area 3 for this purpose. A depression 16 extending over the circumference is provided in the groove base area 3 and divides the groove base area 3 into two ring sections 17 and 18 extending parallel to one another.

The sealing body 8 has a sealing surface 2 on its radially outer end face and, laterally, two side faces 4 and 5. The sealing surface 2 has a first central section I having a radius R, which is less than half the maximum width B, i.e., B/2, of the ring seal 1. Furthermore, a second section II and a third section III are provided, which enclose the first section I between them and are arranged symmetrically with respect to the axis of symmetry S. The second and third sections II and III are designed as straight sections in the cross-sectional profile and thus form planar annular surfaces on the sealing surface 2 of the ring seal 1. Curved sections IV and V, which form the transition from the sealing surface 2 to the side faces 4 and 5, adjoin the second and third sections II and III.

Figure 1:
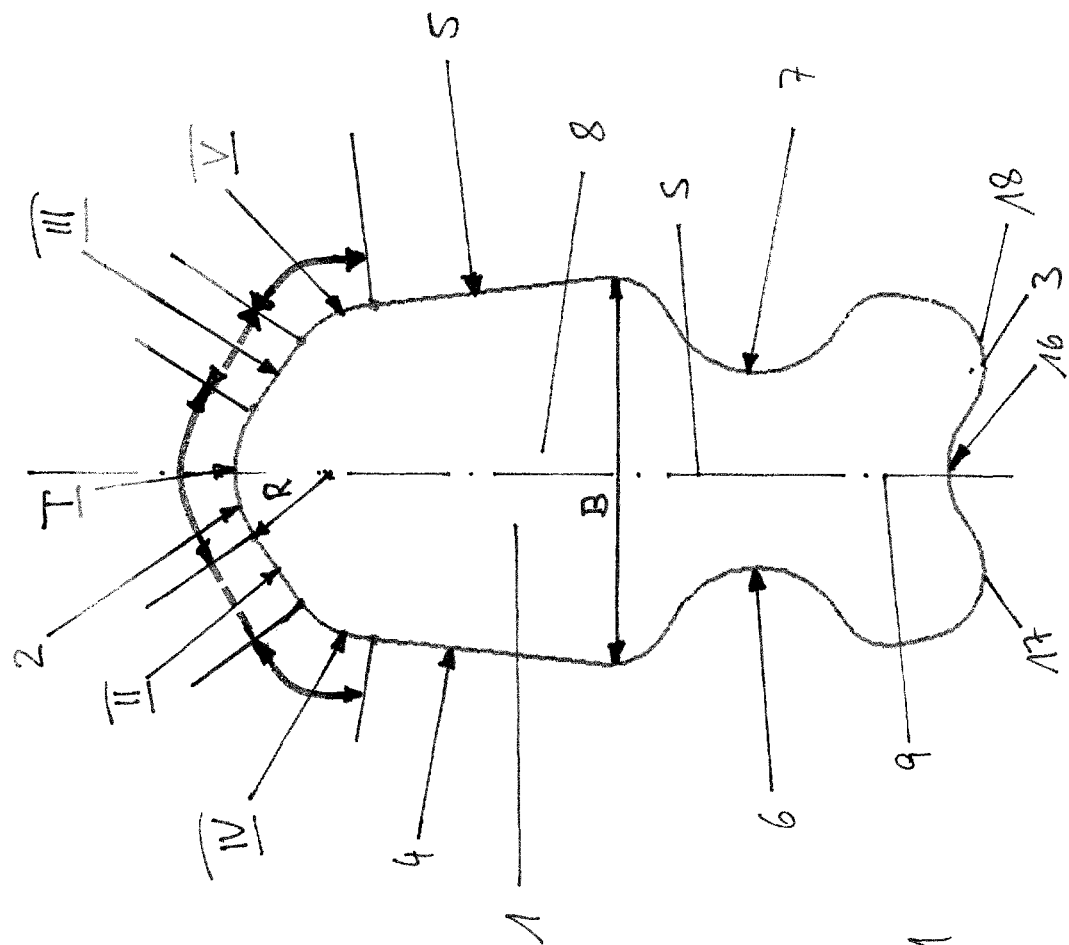
FIG. 1 a ring seal according to the invention in cross-sectional profile, with the different sections of the sealing surface.
Figure 2:
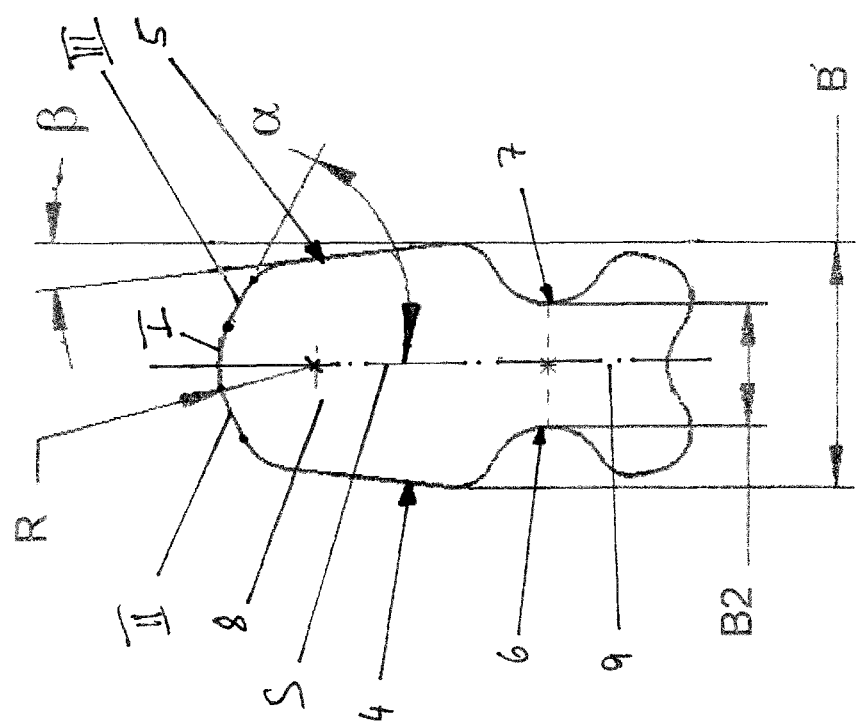
FIG. 2 a ring seal according to the invention in cross-sectional profile, with the angles relative to the axis of symmetry.

In the cross-sectional profile, the second and third sections II and III are formed by straight sections, which are oriented radially outwards at an angle α of 60 to 85 degrees with respect to the axis of symmetry S of the profile of the ring seal 1. The side faces 4 and 5 are also embodied as straight sections and are oriented radially outwards at an angle β of 5 to 30 degrees with respect to the axis of symmetry S. (FIG. 2 shows the angle β with respect to a parallel of the axis of symmetry S.) The side faces 4 and 5 thus extend, starting from the curved fourth and fifth sections IV and V, radially outwards up to the beginning of the recesses 6 and 7 and the maximum width B of the ring seal 1. The tapered section separates the sealing body 8 from the support body 9 and, due to its weakening and reduced width B2, facilitates a tilting movement of the sealing body 8 with respect to the support body 9.

FIG. 3 shows the ring seal 2 in the installed state. The ring seal 1 is arranged in a groove 12 of a first part 11, which has two parallel side walls 13 and 15 and a base area 15. The groove 12 is an annular groove and is open with respect to a radially outer or inner side of the first part 11, depending upon whether the sealing surface 2 is arranged radially outside or inside on the ring seal 1. The first part 11 can, for example, be a piston or a cylinder. The annular seal 1 is supported with its groove base area 3 on the base area 15 of the groove 12 and abuts with its sealing surface 2 in the region of the first section I against a second part 10, which can also be a piston or a cylinder. In the position shown in FIG. 3, the first part 11 and the second part 10 execute no movement relative to one another. The ring seal 1 is slightly compressed and seals the gap SP between the two parts 10 and 11 as intended.

FIG. 4 shows the position of the ring seal 1 when the second part 10 executes a translational displacement movement in the direction of arrow P. Due to the movement of the second part 10, the ring seal 1 with the sealing body 8 is slightly tilted with respect to the support body 9, wherein the ring seal 1 is compressed in the recess 6, which is arranged on the side of the ring seal 1 arranged downstream in relation to the direction of movement P, and is stretched in the recess 7, which is arranged on the side of the ring seal 1 arranged upstream in relation to the direction of movement P. In this case, the contact point of the sealing surface 2 of the cross-sectional profile of the ring seal 1 changes on the second part 10, in which case it moves in the direction of the third section III in the indicated direction of movement P of the second part 10. Due to the oblique orientation of the side faces 4 and 5, the tilting movement of the ring seal 1 in the region of the sealing body 8 is limited by the sealing body 8 coming with its—in the figure—left side face 4 into contact with the left side wall 14 of the groove 12. The side face 4 thus, practically speaking, forms a stop delimiting the tilting movement of the sealing body 8. In the case of an opposing displacement movement of the second part 10, the stop would then be the right side face 5.

The ring seal 1 is designed in such a way that, at lower pressures and with the low forces resulting therefrom during a translational displacement movement of the two parts 10 and 11 relative to one another, it can carry out the described tilting movement by utilizing the flexibility created in the tapered section, and, with the first section I of the sealing surface 2, thereby permanently abuts against the respective other part 10 or 11 in a sealing manner. Due to the small radius R and the oblique orientation of the second and third sections II and III, it is, in the case of lower pressures or forces, largely avoided that the ring seal 1 also abuts with the second or third section II or III against the respective other part 10 or 11. As a result—particularly with low pressures to be sealed—very small frictional forces can be realized, with a simultaneously reliable sealing effect and a high service life of the ring seal 1. The ring seal 1 comes, with the second or third section II or III, into contact with the respective other part only at higher forces, so that in these cases the sealing surface is increased, and the sealing effect is maintained.

In this case, the low frictional forces are achieved by the proposed embodiment of the sealing surface 2 with the first section I having the small radius R and with the two straight sections II and III of the cross-sectional profile. The inclination or oblique orientation of the side faces 4 and 5 serves a purpose independent thereof, viz. a limitation of the tilting movement, by means of which the movement behavior of the ring seal 1 can be improved, irrespective of the embodiment of the sealing surface 2. In the present exemplary embodiment, however, the limitation of the tilting movement of the ring seal 1 additionally has the advantage that it can thereby be ensured that, in the case of low pressures to be sealed and small forces, the ring seal 1 abuts sealingly against the respective other part 10 or 11 only with the first central section I, whereby, in turn, the low friction coefficients can be achieved.

The invention claimed is:

1. A ring seal for sealing a gap between two parts that can be moved axially relative to one another, having
    a cross-sectional profile which is constant in the circumferential direction and has a symmetrical design with respect to a radially oriented axis of symmetry (S), and
    a dynamic sealing surface arranged radially outside or radially inside on the cross-sectional profile, and
    a groove base area arranged radially opposite the sealing surface,
    wherein the sealing surface has a first central section (I) having, in the cross-sectional profile, a radius R of R<B/2 with respect to an axial width B of the ring seal,
    wherein the sealing surface further has a second and third section (II, III) which enclose the first central section (I) between them,
    wherein the sealing surface in the region of the second and third sections (II, III) is embodied as a planar annular surface in each case, which is aligned at an angle ($\alpha$) of 60 to 85 degrees with respect to the axis of symmetry (S) of the cross-sectional profile,
    wherein starting from the second and third sections (II, III), the sealing face transitions into a side face in each case,
    wherein the side faces are oriented at an angle ($\beta$) of 5 to 30 degrees to the axis of symmetry (S),
    wherein the ring seal is tapered in a region between the side faces and the groove base area, and
    wherein the region of the ring seal that is tapered is formed by two opposing concave recesses and thereby has a reduced width (B2) at a narrowest point of the region of the ring seal that is tapered.

2. The ring seal according to claim 1, wherein starting from the first section (I), the sealing surface merges tangentially into the second and third sections (II, III).

3. The ring seal according to claim 1, wherein the ring seal has a larger maximum width (B) in the region of the side faces than in the region of the groove base area.

4. The ring seal according to claim 1, wherein a depression extending in the circumferential direction of the ring seal is provided in the groove base area.

5. The ring seal according to claim 1, wherein the ring seal has a larger maximum width (B) in the region of the side faces than in the region of the groove base area.

* * * * *